Patented Mar. 31, 1936

2,035,515

UNITED STATES PATENT OFFICE 2,035,515

MANUFACTURE OF RESINS

George H. Wilder, Arlington, N. J., assignor to Du Pont Viscoloid Company, Wilmington, Del., a corporation of Delaware No Drawing. Application May 5, 1934,
Serial No. 724,203

7 Claims. (Cl. 260—4)

This invention relates to the manufacture of resins and, more particularly, to an improved process of preparing phenol-formaldehyde cast resins, said process being characterized by the accuracy possible in controlling the properties of the resin prepared and by the adaptability of the process for producing resins of predetermined properties.

The phenol-formaldehyde art dates back to the nineteenth century and through its many years of development numerous important improvements have been made. Nevertheless it is well known in the art that the physical properties of the best phenol-formaldehyde resins known can still be greatly improved upon and, of great importance, that the lack of uniformity of these resins from batch to batch, i. e., the unpredictability of the properties of the resin in any specific batch, is an outstanding objection to all of the processes heretofore known. It is a peculiarity of prior art disclosures of processes of making these resins that they are all open to one of two serious criticisms; they are either so broad and all inclusive as to critical values that, within the limits given, processes of radically different character giving an endless variety of products are included within the description of what purports to be a single definite process, or they disclose very definitely a single process which involves critical conditions that cannot be maintained from batch to batch and, consequently, the properties of the resins of different batches differ and, as a practical matter, it is impossible to produce a resin of predetermined properties except where the permissible range of variation in the properties of the resin is extremely wide. The preparation of phenol-formaldehyde cast resins represents a very delicate problem which cannot be, and has not been, solved by the broad principles laid down in many of the prior art disclosures, especially patent disclosures where the temptation to make very general statements in the attempt to obtain claims of commensurate scope is always present. On the other hand, the prior art disclosures setting forth a single definite process have not taught the art any process which can be controlled with sufficient accuracy to produce batch after batch of resin having identically uniform properties.

An object of the present invention is to provide an improved process of preparing phenol-formaldehyde resins characterized by their substantial infusibility and insolubility, stability to heat and light, toughness, ease of working, and resistance to crazing, warping and shrinking. A further object, and a most important one, is to provide a process which may be controlled sufficiently so that a resin of excellent properties may be produced in batch after batch with the utmost uniformity in the properties of the resins from the different batches. A further object is to provide a process of producing phenol-formaldehyde cast resins in which the critical limits of the process are well demarked and in which it is quite practical and feasible to maintain conditions within such critical limits in order that a resin may be produced having predetermined properties.

The above objects are accomplished according to the present invention by reacting at an elevated temperature one mole of phenol and two moles of formaldehyde, the reaction mixture being adjusted initially to a pH value between 6.5 and 6.9 as measured by the specific indicator brom thymol blue, to form a hydrophilic condensation product of phenol and formaldehyde; this completes the first stage condensation. The pH value of the reaction mixture is then adjusted between 2.0 and 3.1 as measured by the specific indicator alpha dinitro phenol and the reaction continued at elevated temperature for a relatively short period until an at least partially hydrophobic resin is formed which would separate from the reaction mixture if cooled; the resin is then dehydrated, without cooling the reaction mixture, by vacuum distillation or the like and is then poured into molds and cured at an elevated temperature until it is formed into a substantially insoluble and infusible state.

In the process of the present invention the pH values given must be critically observed to obtain best results and, in order that they may be determined definitely, they are herein given with respect to brom thymol blue for values around 6 to 7 and with respect to alpha dinitro phenol for values around 2.0 to 3.1. The pH values given hereinafter and in the claims are all to be interpreted with respect to these indicators.

More particularly the present invention is carried out by mixing phenol with an aqueous formaldehyde solution (aqueous formalin) in the proportion of one mole of phenol to slightly in excess of two moles of formaldehyde, preferably about 2.25 moles of formaldehyde. The excess formaldehyde above two moles is merely to take care of inevitable formaldehyde losses during the reaction; if loss can be absolutely prevented, the proportions would preferably be exactly one mole of phenol to two moles of formaldehyde. The pH value of the mixture is adjusted between 6.5 and 6.9, preferably 6.8, by addition of a small amount of potassium hydroxide or other basic substance and the reaction mixture boiled for 1 to 2 hours, during which time a condensation of the phenol and formaldehyde takes place to give a hydrophilic product. The exact length of time of boiling is not critical but it is critical that a hydrophilic product should result at the end of this first stage condensation. Without interrupting the reaction, phthalic anhydride, or other acid, is added to adjust the pH value of the reaction mixture between 2.0 and 3.1 and the boiling continued, usually for about 5 to 20 minutes, until the nature of the intermediate phenol-formaldehyde condensation product is changed to a partially hydrophobic state, such that, if the reaction mass were to be cooled, the resin would separate from the water. It may be necessary to continue the boil as much as 30 minutes in order to reach this state but prolonged boiling after the hydrophobic resin is obtained is not desirable. After cooling, the resin mixture is filtered and, by vacuum distillation, the water is removed from the resin to give a resin substantially completely dehydrated. The resin is poured into molds which are then placed in ovens held at a temperature between about 65° C. and 95° C. The molds are kept in the oven until the resin is cured and is in a substantially insoluble and infusible state.

The following examples are given in order to illustrate specific embodiments of the present invention:

*Example 1.*—A mixture of one kilo of phenol (one mole), 1.9 kilos of formalin (37½% formaldehyde) (2.25 moles), and 100 cc. of 1.75 N potassium hydroxide solution (9.8 grams potassium hydroxide) having a pH of 6.8 was boiled for 1 hour and 20 minutes. The solution at the end of this time had a pH of 6.2 and was hydrophilic. Upon addition of 60 grams of phthalic anhydride the pH of the solution was lowered to 2.8 and the reaction mass was boiled for 10 minutes. At this point the resulting liquid is hydrophilic while hot but on cooling a hydrophobic resin separated. The solution was filtered without cooling and 50 cc. of glycerine was added. The mass was then vacuum distilled until a substantially completely dehydrated resin was obtained. The clear liquid resin was then poured into lead molds and cured in a drying oven at 80° C. for four days. A clear, transparent, substantially insoluble and infusible resin resulted.

*Example 2.*—A mixture of one kilo of phenol (one mole), 1.7 kilos of formalin (37½% formaldehyde) (2.0 moles), and 50 cc. of 1.75 N sodium hydroxide solution (3.5 grams sodium hydroxide) having a pH of 6.5 was boiled for 1 hour and 40 minutes. At this point the resulting hydrophilic liquid had a pH of 6.3. One hundred grams of benzoic acid was added which lowered the pH of the reaction mixture to 3.1. The mass was boiled for 20 minutes longer giving a resin which was hydrophilic when hot but a hydrophobic resin separating out on cooling. The reaction mixture, without being allowed to cool, was filtered and 30 cc. of glycerin added. The resin was substantially completely dehydrated by vacuum distillation and cured in molds as in the preceding example. A practically infusible and insoluble transparent resin was obtained.

*Example 3.*—A mixture of 500 grams of phenol (one mole), 890 grams of formalin (37½% formaldehyde) (2.1 moles), and 10 grams of barium hydroxide having a pH of 6.8 was boiled for 1 hour and 30 minutes, the hydrophilic reaction product at this point having a pH of 6.1. 45 grams of lactic acid (85%) was added which reduced the pH to 3.0. The boiling was continued for 30 minutes longer, the resulting reaction mass being hydrophilic when hot but a sample separating into two liquids on cooling. The solution was filtered while still hot, 35 cc. of triacetin was added and the mass substantially completely dehydrated by vacuum distillation. The liquid resin obtained was poured into molds and cured at 80° C. for 4½ days. A resin similar to that in Examples 1 and 2 was obtained.

*Example 4.*—A mixture of 2 kilos of phenol (one mole), 3.8 kilos of formalin (37½% formaldehyde) (2.25 moles), and 28 grams of calcium hydroxide gave a pH of 6.8. This mixture was boiled for 1 hour and 25 minutes at which point the reaction mass was hydrophilic and had a pH of 6.0. 120 grams of phthalic anhydride were added reducing the pH to 3.0 and the mixture boiled for 10 minutes further. The reaction mass at this period was hydrophilic while hot but a sample, upon cooling, separated into two layers. The reaction mixture while still hot was filtered, 100 cc. of glycol was added and the resin formed by the condensation was substantially completely dehydrated by vacuum distillation. The substantially anhydrous resin was poured into molds and cured at 80° C. for 4 days. A slightly cloudy, substantially infusible and insoluble resin was obtained.

*Example 5.*—A mixture of one kilo of phenol (one mole), 1.86 kilos of formalin (37½% formaldehyde) (2.2 moles), and 150 cc. of potassium carbonate (142 grams per liter) having a pH of 6.8 was boiled for 1 hour and 20 minutes. At this point a hydrophilic condensation of phenol and formaldehyde was formed, the reaction mixture having a pH of 6.7. 150 cc. of 2N solution of tartaric acid was added thereby reducing the pH of the mixture to 3.0. In this instance a hydrophobic resin separated out from the water of the reaction mixture upon cooling of a sample without any further boiling and, therefore, the hot reaction mixture was immediately filtered. 40 cc. of diethylene glycol was added and the resin dehydrated substantially free of water by vacuum distillation. The resin was poured into molds and cured for 3½ to 4 days at 80° C. A substantially infusible and insoluble resin was obtained which was translucent.

*Example 6.*—A mixture of 1 kilo of phenol (1 mole), 1.9 kilos of formalin (37½% formaldehyde) (2.25) moles, and 14 grams of calcium hydroxide having a pH of 6.9, was boiled for 1 hour and 30 minutes. The hydrophilic solution at this point had a pH of 6.0. 40 grams of succinic acid was added reducing the pH of the mixture to 3.0. The boiling was continued for 15 minutes, the solution filtered without cooling and 85 cc. of glycerin was added. The hot reaction mixture was then dehydrated by vacuum distillation and the resulting liquid anhydrous resin was poured into molds and cured at 80° C. for 3½ to 4 days. A substantially infusible and insoluble resin was obtained which was translucent as in Example 5.

It will be understood that the above examples have been given merely to illustrate the invention which, although specific as to the pH value of the initial reaction mixture, the formation of a hydrophilic condensation product at the end of the first condensation stage, subsequent adjustment of the pH value of the mixture between 2.0 and 3.1, continuation of the reaction until a resin is formed which is hydrophobic on cooling, with subsequent filtration of the mixture without cooling and dehydration, is otherwise subject to considerable variation.

The proportion of phenol and formaldehyde need not be exactly 1 mole to 2 moles, respectively, although if a substantially greater amount of formaldehyde is used it must either be lost during the reaction or else a resin of unfavorable properties will be obtained. Likewise the use of appreciably less than 2 moles of formaldehyde will result in a resin of inferior properties. As those skilled in this art will understand, the substitution in part, or even in whole, of the phenol by other phenolic bodies, such as resorcinol, hydroquinone, cresol, and the like, is within the scope of the invention.

The adjustment of the reaction mixture to give the initial pH value between 6.5 and 6.9 may be accomplished by the addition of a small amount of practically any inorganic basically reacting compound, such as hydroxide, carbonates, and the like, except the ammonium compounds which would not be inert in this reaction. The selection of a suitable base for this purpose presents no problem to those skilled in the art.

During the first condensation the time of reaction may be varied within wide limits and need not necessarily be at the boiling point of the reaction mixture although this is customary and convenient. Usually prolonging the boiling for more than two hours is entirely unnecessary but no harm is done as long as a hydrophilic resin is obtained at the end of this first condensation. A period of boiling of less than one hour would be unusual and not particularly desired due to the incompleteness of the condensation.

Any organic acid may be used to adjust the reaction mixture to a pH between 2.0 and 3.1, the art being familiar with a number of particularly suitable acids for this purpose, such as phthalic anhydride, lactic acid, and the like. The duration of the boiling of the reaction mixture after the adjustment of the pH is preferably as short as possible consistent with the formation of a resin which would be hydrophobic if the reaction mixture were allowed to cool. The resin obtained at this point differs from the first condensation product which is a truly hydrophilic body as it does not separate from the reaction mixture even if it is cooled. As the process is carried out, the reaction mixture is not allowed to cool after the second boil but the formation of the hydrophobic resin can be tested by taking a small portion of the batch and cooling it to observe whether or not a resin separates out from the water.

In the specific examples such compounds as glycerin, glycol, triacetin, diethylene glycol, and the like, were added to the reaction mixture prior to dehydration for the purpose of aiding in the removal of water. These compounds also function as plasticizers in the finished resin. The use of these materials is optional, the prior art being familiar with the advantages and disadvantages of employing them. It is preferred to use them in the proportion of about 1.0% to 15.0% by weight of the finished resin, although the proportion may be varied more widely depending upon the specific properties desired in the finished resin.

To carry out the present invention successfully, substantially all of the water must be removed from the resin during dehydration. Although the resin obtained in Examples 4 and 5 gave a slightly cloudy or translucent resin, nevertheless practically all of the water was removed from the resin even in these two examples and the resin was in a substantially anhydrous state when poured into the molds.

A temperature of about 80° C is considered the optimum temperature for curing which, however, can be carried out between 65° C. and 95° C., although at the higher temperature the resin cures more rapidly and in some instances accentuates the characteristic yellowish discoloration which is negligible if the curing is done more slowly.

As those skilled in the art will understand, the addition of organic coloring matter, soluble dyes, insoluble inorganic coloring matter, pigments, and the like, is permissible and will ordinarily be done in obtaining commercial products. In the specific examples the addition of coloring matter, and the like, was not shown as it was desired to illustrate the natural typical properties of the resin. Likewise, fillers such as starch, wood flour, wood pulp, and the like, can be added to produce certain effects. Also, not only the high boiling water soluble organic compounds such as glycerin, glycol, and the like, may be added to remain in the finished resin and act as plasticizers, but other organic compounds can be added to function as plasticizers such as camphor, and the like.

One of the advantages of the present invention is that it provides a process of making phenol-formaldehyde cast resins which may be easily and accurately controlled. The fact that the ratio of the phenol to the formaldehyde is one mole to two moles gives a very stable resin since these are equilibrium proportions for a stable condensation. If more than two molecular weights of formaldehyde are used there is an excess of formaldehyde which must be lost either during the condensation, dehydration, or curing periods or after the resin has reached a substantially infusible and insoluble state. This excess formaldehyde has a strong tendency to make the resin shrink, craze and warp even after prolonged curing. It is permissible in the present invention to use more than two moles of formaldehyde but only such a slight excess as will escape from the reaction vessel during the condensation, that is, the ultimate composition of the resin according to the present invention is substantially one mole of phenol to two moles of formaldehyde. By observing the pH values herein disclosed a resin of predetermined properties may be obtained and any resin may be reproduced an indefinite number of times, an important advantage of the present process over those known heretofore.

A further advantage of the invention is that, by carrying out the reaction between the pH limits given, a resin substantially hydrophobic in character results and which releases readily not only the extraneous water in the reaction mixture but also the water of condensation. This allows the production of a substantially anhydrous resin of great uniformity without any particular difficulty and, further, since the final resin product in every instance is substantially anhydrous, it greatly facilitates the reproduction of resins of identical properties. A still further advantage of the process is that polymerization is started during the dehydration cycle and continues during the curing cycle while the condensation is completed prior to these stages of the process, thus imparting greater uniformity to the resin, and, coupled with the substantially complete dehydration, gives an extremely tough, practically infusible and insoluble resin which is characterized by the ease with which it may be worked in fabricating various articles. Resins produced as herein disclosed are also characterized by their exceptional stability and freedom from warping and crazing as compared with prior art resins of this type.

As many apparently widely different embodiments of this invention may be made without departing from the spirit and scope thereof, it is to be understood that the invention is not limited to the specific embodiments thereof except as defined in the appended claims.

I claim:

1. Process of preparing a cast resin which comprises reacting at approximately the boiling temperature of the reaction mixture, one mole of phenol and approximately two moles of formaldehyde in aqueous solution, the reaction mixture being adjusted to an initial pH between 6.5 and 6.9, to form a hydrophilic condensation of phenol and formaldehyde, adjusting the pH of the reaction mixture between 2.0 and 3.1 and continuing the reaction until a resin hydrophobic in cold water is formed, dehydrating the resin without cooling, and curing the resin at a temperature of 65° C. to 95° C. until it is formed into a substantially insoluble and infusible state.

2. Process of preparing a cast resin which comprises boiling a mixture of one mole of phenol and approximately two moles of formaldehyde in aqueous solution, the reaction mixture being adjusted to an initial pH between 6.5 and 6.9, to form a hydrophilic condensation of phenol and formaldehyde, adjusting the pH of the mixture between 2.0 and 3.1 and continuing the boiling until a resin hydrophobic in cold water is formed, vacuum distilling the mixture, without cooling, to substantially completely remove the water therefrom, pouring the liquid substantially anhydrous resin resulting into molds, and curing the resin at a temperature of 65° C. to 95° C. until it is formed into a substantially insoluble and infusible state.

3. Process of preparing a cast resin which comprises boiling for a period of 1 to 2 hours a mixture of one mole of phenol and approximately two moles of formaldehyde in aqueous solution, the reaction mixture being adjusted to an initial pH between 6.5 and 6.9, to form a hydrophilic condensation of phenol and formaldehyde, adjusting the pH of the mixture between 2.0 and 3.1 and continuing the boiling for a period of 5–30 minutes until a resin hydrophobic in cold water is formed, vacuum distilling the mixture, without cooling, to substantially completely remove the water therefrom, pouring the liquid substantially anhydrous resin resulting into molds, and curing the resin at a temperature of 65° C. to 95° C. until it is formed into a substantially insoluble and infusible state.

4. Process of preparing a cast resin which comprises adding a basically reacting metal compound to a mixture of one mode of phenol and approximately two moles of formaldehyde in aqueous solution to adjust the initial pH of the mixture between 6.5 and 6.9, boiling the mixture for a period of 1 to 2 hours to form a hydrophilic condensation of phenol and formaldehyde, adding an organic acid to the reaction mixture to adjust the pH thereof between 2.0 and 3.1 and continuing the boiling for a period of 5–30 minutes until a resin hydrophobic in cold water is formed, vacuum distilling the mixture, without cooling, to substantially completely remove the water, pouring the liquid substantially anhydrous resin resulting into molds, and curing the resin at a temperature of 65° C. to 95° C. until it is formed into a substantially insoluble and infusible state.

5. Process of preparing a cast resin which comprises adding a basically reacting metal compound to a mixture of one mole of phenol and approximately two moles of formaldehyde in aqueous solution to adjust the initial pH of the mixture between 6.5 and 6.9, boiling the mixture for a period of 1 to 2 hours to form a hydrophilic condensation of phenol and formaldehyde, adding an organic acid to the reaction mixture to adjust the pH thereof between 2.0 and 3.1 and continuing the boiling for a period of 5–30 minutes until a resin hydrophobic in cold water is formed, adding a high boiling water soluble organic compound from the group consisting of glycerin, ethylene glycol, diethylene glycol, and triacetin to the reaction mixture, vacuum distilling the mixture, without cooling, to substantially completely remove the water, pouring the liquid substantially anhydrous resin resulting into molds, and curing the resin at a temperature of 65° C. to 95° C. until it is formed into a substantially insoluble and infusible state.

6. Process of preparing a cast resin which comprises adding a basically reacting metal compound to a mixture of one mole of phenol and approximately two moles of formaldehyde in aqueous solution to adjust the initial pH of the mixture to about 6.8, boiling the mixture for a period of 1 to 2 hours to form a hydrophilic condensation of phenol and formaldehyde, adding an organic acid from the group consisting of phthalic anhydride, benzoic, lactic, tartaric, and succinic acids, to the mixture to adjust the pH thereof between 2.0 and 3.1 and continuing the boiling for a period of 5–30 monutes until a resin hydrophobic in cold water is formed, adding a high boiling water soluble organic compound from the group consisting of glycerin, ethylene glycol, diethylene glycol, and triacetin to the reaction mixture, vacuum distilling the mixture, without cooling, to substantially completely remove the water therefrom, pouring the liquid substantially anhydrous resin resulting into molds, and curing the resin at a temperature of 65° to 95° C. until it is formed into a substantially insoluble and infusible state.

7. A transparent cast resin comprising a substantially dehydrated, polymerized condensation product of phenol and formaldenyde in the molecular proportions of 1–2, respectively, said resin being formed by condensing the phenol and formaldehyde in aqueous solution in a reaction mixture adjusted to an initial pH between 6.5 and 6.9, and dehydrating and polymerizing the condensation product after adjusting the pH of the mixture between 2.0 and 3.1, and said resin being characterized by its hardness, toughness, insolubility, infusibility, and resistance to warping and crazing.

GEORGE H. WILDER.